Figure 2:
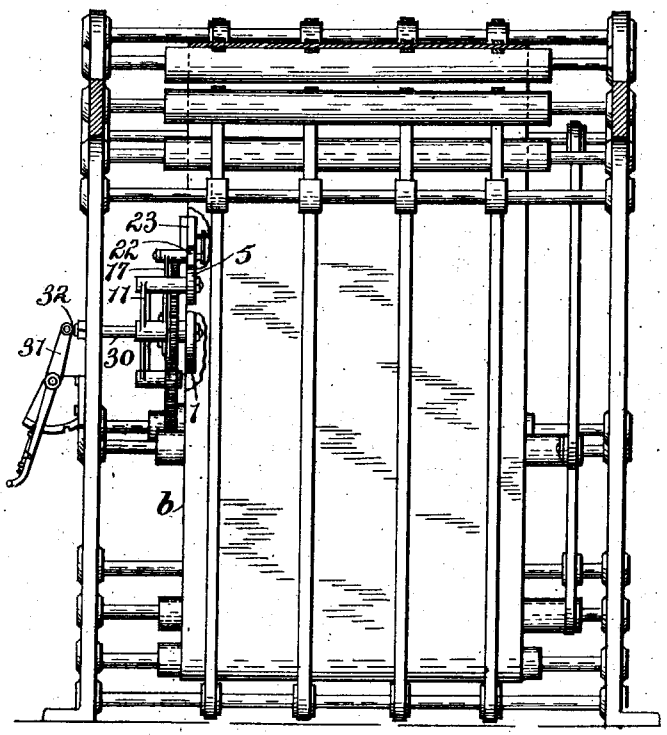

No. 11,881. Reissued Jan. 8, 1901.

L. L. CARSON.

PRINTING PRESS.

(Application filed Oct. 18, 1900.)

4 Sheets—Sheet 1.

Witnesses
Geo. E. Prech.
Alex. D. Mabon.

Inventor
Lewis L. Carson
By Jas. Neale
Attorney

THE NORRIS PETERS CO., WASHINGTON, D. C.

No. 11,881. Reissued Jan. 8, 1901.
L. L. CARSON.
PRINTING PRESS.
(Application filed Oct. 18, 1900.)
4 Sheets—Sheet 2.
Fig. 10.
Fig. 3.
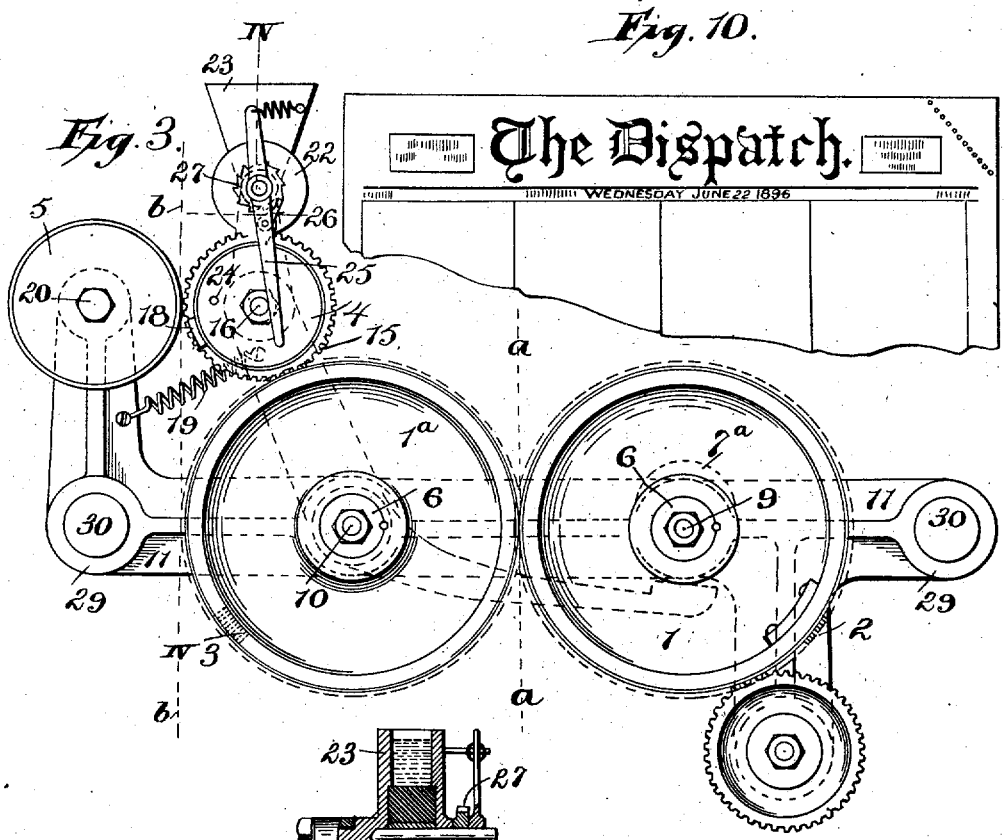
Fig. 4.
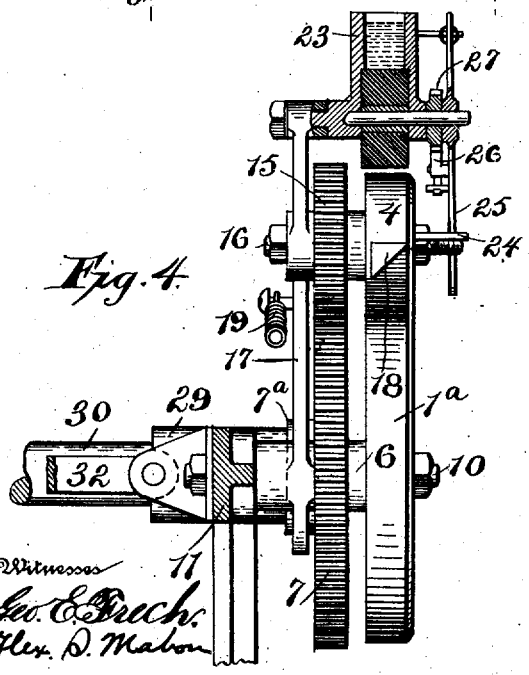
Fig. 5.
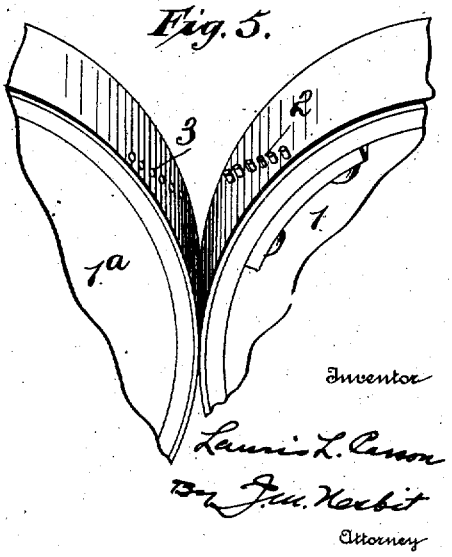
Witnesses
Geo. E. Frech.
Alex. D. Mabon
Inventor
Lewis L. Carson
By Jas. Herbert
Attorney
THE NORRIS PETERS CO., WASHINGTON, D. C.

No. 11,881. Reissued Jan. 8, 1901.

L. L. CARSON.

PRINTING PRESS.

(Application filed Oct. 18, 1900.)

4 Sheets—Sheet 3.

Witnesses

Geo. E. Frech.

Alex. D. Mabon

Inventor

Lewis L. Carson

By Jas. Kerr

Attorney

THE NORRIS PETERS CO., WASHINGTON, D. C.

No. 11,881. Reissued Jan. 8, 1901.

L. L. CARSON.

PRINTING PRESS.

(Application filed Oct. 18, 1900.)

4 Sheets—Sheet 4.

Witnesses

Geo. E. Fuch.

Alex. D. Mabon.

Inventor

Lewis L. Carson

By Jas. Norbit

Attorney

THE NORRIS PETERS CO., WASHINGTON, D. C.

UNITED STATES PATENT OFFICE.

LAURIS L. CARSON, OF PITTSBURG, PENNSYLVANIA, ASSIGNOR, BY MESNE ASSIGNMENTS, TO THE FEDERAL APPLIANCE AND MANUFACTURING COMPANY, OF SAME PLACE.

PRINTING-PRESS.

SPECIFICATION forming part of Reissued Letters Patent No. 11,881. dated January 8, 1901.

Original No. 627,047, dated June 13, 1899. Application for reissue filed October 18, 1900. Serial No. 33,528.

*To all whom it may concern:*

Be it known that I, LAURIS L. CARSON, a citizen of the United States, residing at Pittsburg, in the county of Allegheny and State of Pennsylvania, have invented or discovered certain new and useful Improvements in Printing-Presses, of which improvements the following is a specification.

It is the custom with many newspaper publishers to allow news companies and other dealers a rebate for unsold copies. In making returns to the publishing companies the dealers tear off the head-lines of the first pages of the papers and send them to the publishers. The latter are subjected to great frauds by newsboys and others tearing off the head-lines from papers which have been thrown away in street-cars and elsewhere. These fraudulent head-lines of papers are sent to the publishers as portions of unsold papers, thereby subjecting them to great loss. Many devices have been suggested for preventing these fraudulent practices, such as fastening together two or more pages of the paper in such manner by paste or mechanical devices that the portions which are to be returned to the publishers will be mutilated when the papers are opened by the readers. The means heretofore suggested have been impracticable either for the reason that the pages cannot be secured together as rapidly as the papers are printed and folded or the pages have been so secured together that portions of the reading matter are mutilated.

One object of the present invention is to provide improved means operating in conjunction with a printing-press for securing together two or more sheets of a newspaper as rapidly as such sheets are printed and folded and in such manner that when the paper is opened its heading or other portion will be so mutilated as to prevent its fraudulent return.

A further object of the present invention is to provide means operative at the same speed as the printing and folding mechanisms to partially isolate or sever a portion of a page of paper and cause such partially isolated or severed portion to be secured to an adjoining page, so that on separation of the pages the partially-severed portion will be easily separated from its page along the line of partial separation and remain secured to the other page.

Figure 1:
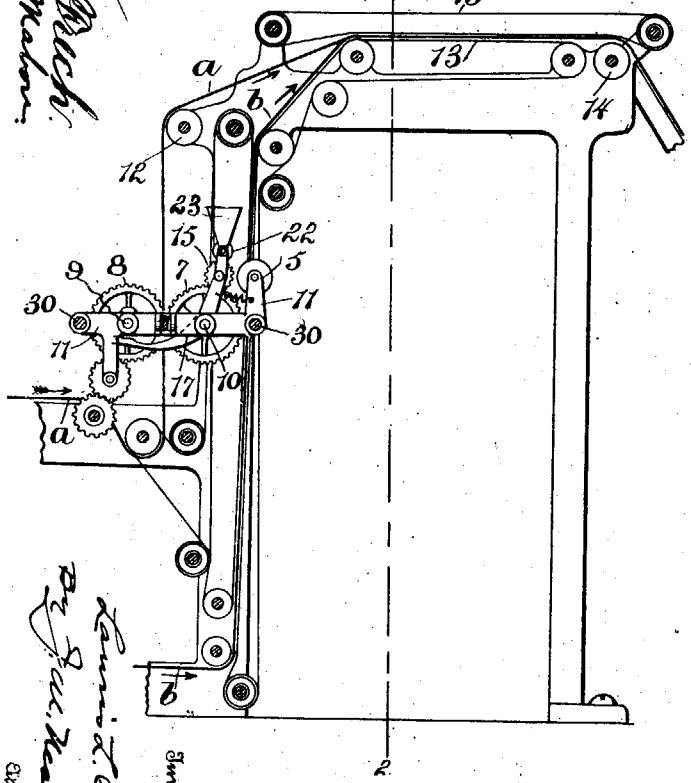
Figure 6:
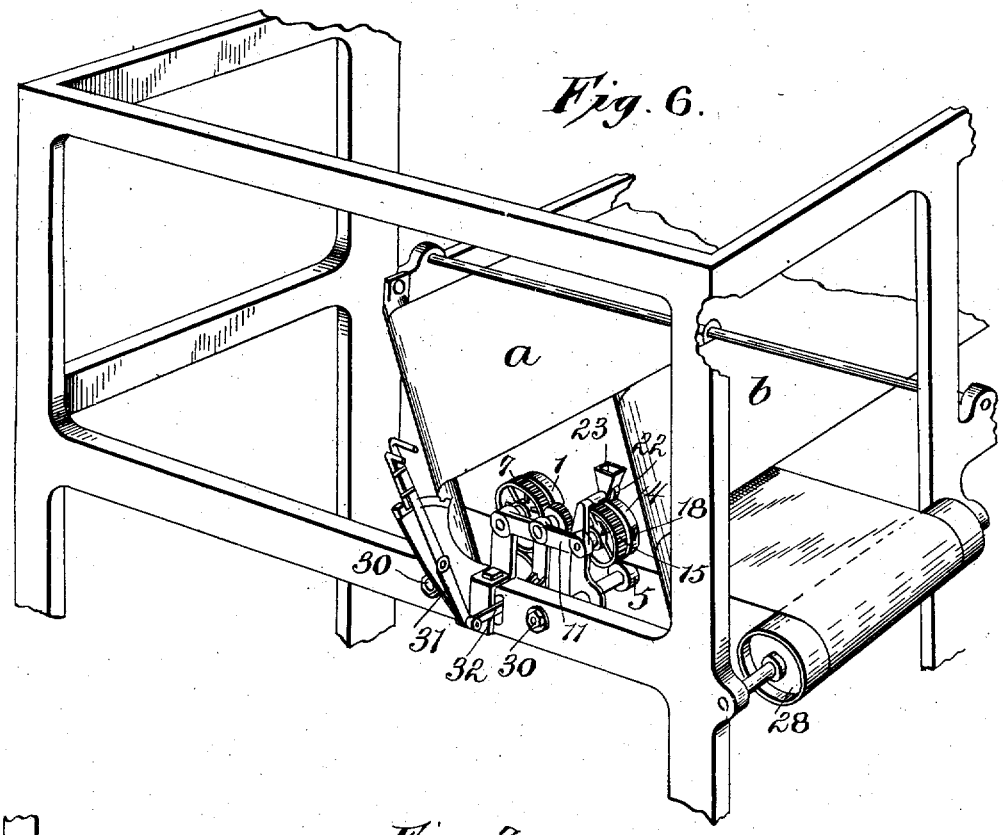
Figure 7:
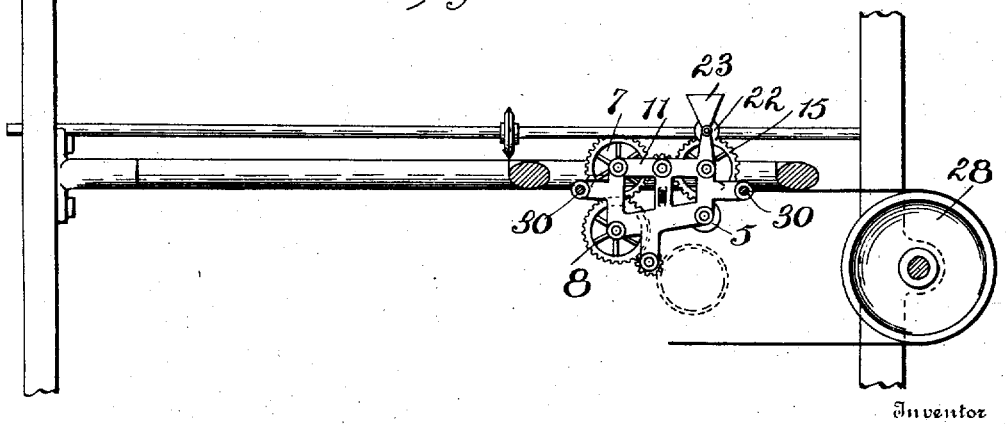
Figure 8:
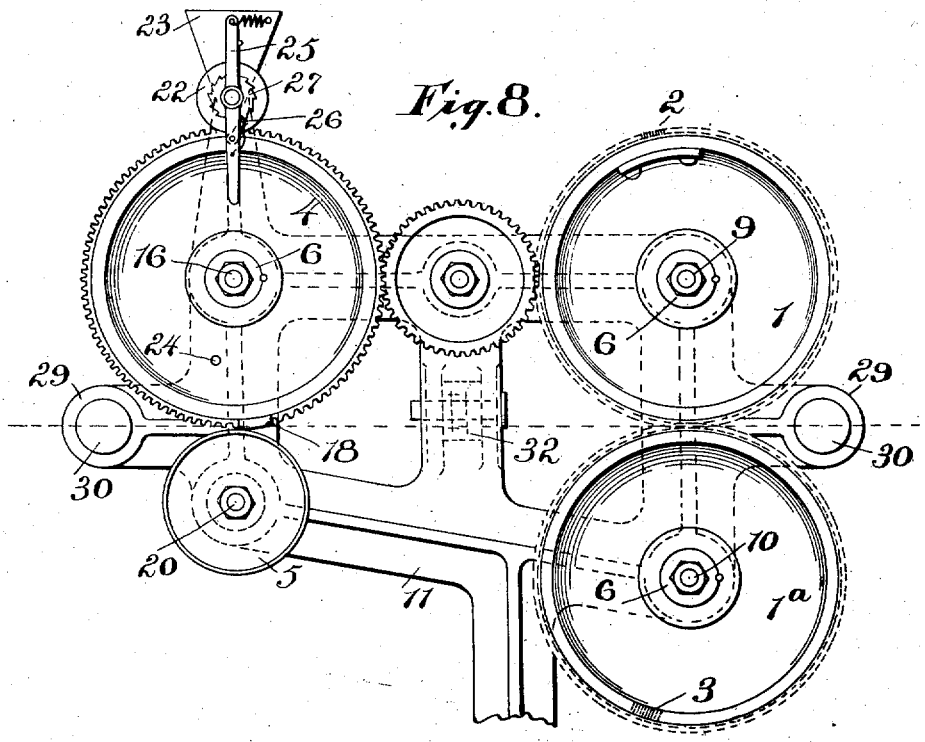
Figure 9:
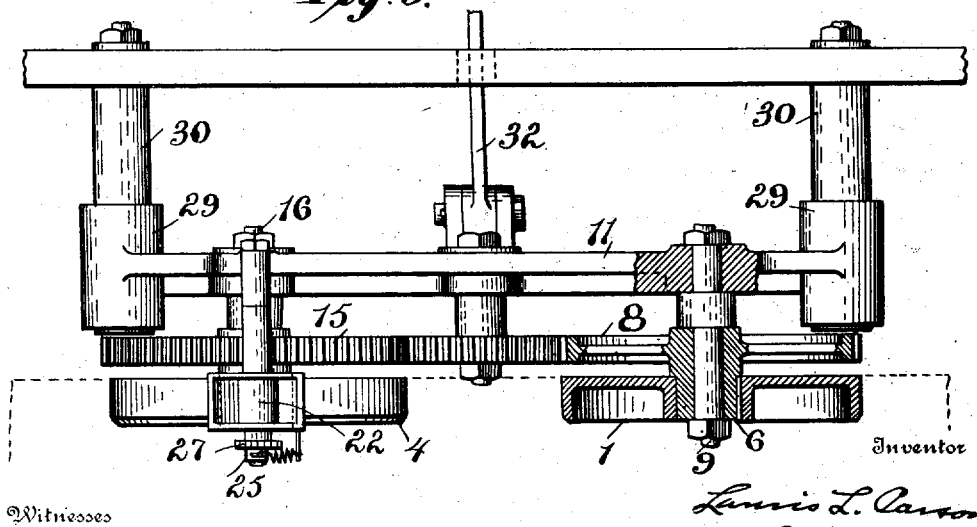

In the accompanying drawings, forming part of this specification, Figure 1 is a view in side elevation of a portion of a printing-press having my improvements applied thereto. Fig. 2 is a cross-sectional elevation of the same, the plane of section being indicated by the line 2 2 of Fig. 1. Fig. 3 is a side elevation, on an enlarged scale, of the perforating and paste-applying mechanism. Fig. 4 is a sectional view of the same, the plane of section being indicated by the line IV IV, Fig. 3. Fig. 5 is an enlarged view of portions of the perforating-rolls. Fig. 6 is a perspective view showing my improvements applied to a press of different construction. Fig. 7 is a sectional elevation. Fig. 8 is a side elevation, on an enlarged scale, of the modified construction of the perforating and paste-applying mechanisms. Fig. 9 is a plan view of the same, a portion of one of the perforating-disks and its driving-pinion and bearing being broken away; and Fig. 10 shows a paper perforated and pasted.

In the practice of my invention the edge of one of the webs, preferably the outside web *a*, is caused to pass on its way from the printing-cylinders to the folders between rolls 1 and $1^a$. One of these rolls is provided with a series of pins 2 and the other roll with holes 3, into which the pins may pass, so as to form a line or lines of perforations in the web. These pins and holes may be arranged, as shown, to form a line of perforations diagonally across the upper right-hand corner of a sheet when severed from the web, as shown in Fig. 10, or may be arranged so as to partially sever portions of any desired shape along any edge of the web. After the formation of the perforations paste is applied to the inner surface of the partially-severed section or to the outer side of the second or inner web by rolls 4 and 5 in such position that when the two webs pass one onto the other just prior to the operation of the folders the partially-severed section will be caused to tightly adhere to the adjacent web.

It will be readily understood by those skilled in the art that the perforating and paste-applying mechanisms can be arranged so as to sever or isolate any portion of any of the sheets forming the paper and to so apply the paste that such partially-severed or isolated portion will firmly adhere to the adjacent sheet, so that such partially-severed portion will be entirely torn out when the paper is opened out. As a general thing it will be more convenient to arrange the perforating and pasting rollers so as to operate on the outer edges of the outside webs, as shown in Figs. 1, 2, 6, and 7. A desirable construction in so using the mechanism consists in securing the rolls 1 and 1ª on the extended hubs 6 of pinions 7 and 8, which intermesh and are mounted on pins 9 and 10, secured in the frame 11. This frame is so fastened to the frame of the printing-press that the edge of the outside web will pass between the rolls 1 and 1ª, and the rolls are driven by a train of gearing extending from any suitable part of the press and so proportioned that the rolls 1 and 1ª will have a peripheral speed equal to the speed of the webs through the press.

It is preferable to apply paste to the inner side of the portion partially isolated; but in some presses the arrangement of the guide-rollers and the proximity of the first and second webs and other structural features of the press may render such application of the paste impracticable—as, for example, in the form of press shown in Figs. 1 and 2 the outside web *a* after being operated on by the rolls 1 and 1ª passes over the guide-roller 12 and then joins the inner web *b* and the two webs are carried along by tapes 13 to the guide-roller 14, whence the webs pass to the folder. If the paste should be applied to any portion of the inner surface of the web *a*, it would be rubbed off on the guide-roller 12 and then smeared on the other parts of the web. To avoid such an objectionable feature, provision is made for applying the paste to portions of the outer surface of the inner web *b*, corresponding in position to the partially severed or isolated portion of the web *a*, so that when the webs come together such partially-severed portions of web *a* will be pressed onto the pasted portion of web *b*. It is also characteristic of the arrangement of the outer and inner webs in some presses that the webs are too nearly adjacent to permit of the employment of a paste-applying roll equal in peripheral length to the length of the sheets into which the webs are divided. In such case a smaller roller having a peripheral length equal to half or quarter of the length of the sheets is so mounted on a movable part, which is shifted to bring the paste-applying portion of the roll against the web *b* at every second, third, or fourth revolution thereof, dependent on the relation of the length of the periphery of the roll to the length of sheets into which the web is to be divided. In applying my improvement to such a press the roll 4 is preferably secured on the extended hub of the pinion 15, which is loosely mounted on a pin 16, which is secured on one arm of lever 17. This lever is pivotally mounted on the pin 10, supporting the roll 1ª, and the opposite end of the lever projects into the path of movement of a cam projection 7ª on the hub of pinion 8. As the rolls 1 and 1ª have a peripheral length equal to the lengths of the sheets, they are geared to make one revolution while any given point of the continuous web is traveling a distance equal to the length of sheets into which the web is subsequently cut. The pin 16, on which the pinion 15 and roll 4 are mounted, is so located on the arm of the lever 17 that the pinion will be constantly in mesh with the pinion 7, thereby insuring the constant rotation of the roll 4. This roll is preferably provided with a projection 18, having a shape and superficial area proportional to the area to which paste is to be applied. As shown in Fig. 1, the lever 17 is so shaped that the roll 4 will project between the webs *a* and *b*, and the roll is so held normally by spring 19 that the projection 18 will press against the outer surface of the web *b* at each alternate revolution; but contact with the web is prevented at every other revolution of the roll by the shifting of the lever 17 by the cam 7ª. In order that the projection 18 may press firmly against the web *b*, the latter is supported by a roll 5, loosely mounted on a pin 20, projecting from an angular extension 21 of frame 11. This roll is so arranged that the web *b* will always pass along in contact therewith and will rotate freely when the web is being acted on by the projection 18. Paste is applied to the surface of the projection by a roll 22, mounted in the lower end of a paste-receptacle 23, carried by the lever 17. The roll is rotated intermittingly by a pin 24 on the side of the roll 4, striking against and shifting a lever 25, mounted on the shaft of roll 22. On the lever is mounted a spring-actuated pawl 26, adapted to engage the ratchet 27 on the shaft of roll 22. As the roll 22 is rotated it will bring portions newly covered with paste into position to apply the paste to the surface of the projection 18.

In some presses the arrangement of the webs is such as to afford ample room for the application of my improvements thereto in such manner that portions of the outside web cannot only be perforated or partially severed, but the paste can be applied to the inner surface of such portions. Such a press is illustrated in Figs. 6 and 7, the outside web being indicated at *a* and the inside web at *b*, said webs being superposed one upon the other as they pass around the guide-roller 28. In adapting my improvements to such a machine the rolls 4 and 5 are so arranged that the web *a* will pass between immediately after being operated on by rolls 1 and 1ª. The roll 4 is made of such a size that the diameter of the circle described by the surface of projection 18 is equal to the diameter of roll 1 or 1ª, and the pin on which the roll and its driving-pinion are mounted is fixed to the frame 11. The paste-receptacle 23 is connected to the frame 11 in such manner that its roll 22 is held in operative relation to the roll 4.

The perforations around the point of attachment form a tearing line or lines and obviate unnecessary mutilation of the paper when being opened. It will be understood, however, that such perforating is not an indispensable part of the invention and may be omitted, if desired, as in the absence of such a tearing-line the pasted sheets may be parted without undue or injurious mutilation.

As the copies of some editions are not returnable and need not therefore be marked, it is preferred that provision shall be made for shifting the marking mechanism out of the line of movement of the webs. To this end the frame 11 is provided with sockets 29 for the reception of supporting-pins 30, secured to the frame of the press. A lever 31 is connected by a link 32 to the frame 11, whereby the frame can be shifted along pins 30 into and out of operative position as required.

I claim herein as my invention—

1. The combination of means for partially severing or isolating portions of one of two or more webs of paper passing through a press and means for so applying paste to portions of one of said webs that when the two webs are superposed one upon the other, the partially-severed portions will adhere to the adjacent web, substantially as set forth.

2. The combination of means for partially severing or isolating portions of one of two or more webs of paper passing through a press and means for applying paste to the inner surfaces of the partially-severed portions, substantially as set forth.

3. The combination of a pair of perforating-rolls arranged to partially sever or isolate portions of one of two or more webs of paper passing through a press, a roll for so applying paste to portions of one of said webs that when the webs are superposed one upon the other the partially-severed portion will adhere to the adjacent web and means for applying paste to said roll, substantially as set forth.

4. The combination of a pair of perforating-rolls arranged to partially sever or isolate portions of one of two or more webs of paper passing through a press, a roll for so applying paste to portions of one of said webs that when the webs are superposed one upon the other the partially-severed portions will adhere to the adjacent web, and means for shifting said paste-applying roll, substantially as set forth.

5. In a printing-press attachment, the combination of means for fastening two or more sheets of a newspaper together, and means for perforating one or more of the sheets around the point of attachment, substantially as set forth.

6. The combination with a printing-press, of a paste-applying roll, the peripheral length of the roll being proportional to the length of sheets into which the webs passing through the press are subsequently cut, and mechanism for actuating said roll to apply paste to one of said webs at one point on each of the subsequently cut sheets, whereby when the two webs are superposed one upon the other they will adhere to each other at the paste-applied points.

7. In a printing-press attachment, the combination of a paste-applying roll having peripheral length proportionate to the length of sheets being printed, and mechanism for actuating the roll to apply paste at corresponding points on sheets passing the roll.

8. In a printing-press attachment, the combination of a rotating device for securing together two or more sheets of a newspaper, and mechanism for so actuating the securing device that the length of the circle described thereby is proportionate to the length of the sheets, whereby the sheets are secured at corresponding points.

9. In a printing-press attachment, the combination of a rotating device for securing together two or more sheets of a newspaper, and mechanism for so actuating the securing device that the length of the circle described thereby is the same as the length of the sheets, whereby the sheets are secured at corresponding points.

10. In a printing-press attachment, the combination of a rotating device for securing together two or more sheets of a newspaper, and gearing interposed between the securing device and a rotating member of the press for so actuating the securing device that the length of the circle described thereby is proportionate to the length of the sheets, whereby the sheets are secured at corresponding points.

11. In a printing-press attachment, the combination of a rotating paste-delivering device, and mechanism for so actuating said device that the length of the circle described thereby is proportionate to the length of sheets being printed.

12. In a printing-press attachment, the combination of a roll, a paste-delivering projection on the periphery of the roll, means for applying paste to said projection, and mechanism for so actuating the roll that the length of the circle described by said projection is proportionate to the length of sheets being printed, whereby paste is applied at corresponding points on the sheets.

13. In a printing-press attachment, the combination of mechanism for securing together two or more sheets, and means for moving said mechanism sidewise toward and away from the edges of the sheets, whereby the mechanism may be rendered operative or inoperative.

In testimony whereof I have hereunto set my hand.

LAURIS L. CARSON.

Witnesses:
ALEX. S. MABON,
J. M. NESBIT.